United States Patent
Nakanishi

(10) Patent No.: US 10,054,217 B2
(45) Date of Patent: Aug. 21, 2018

(54) SHIFT DEVICE

(71) Applicant: KABUSHIKI KAISHA TOKAI-RIKA-DENKI-SEISAKUSHO, Aichi (JP)

(72) Inventor: Kenji Nakanishi, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 387 days.

(21) Appl. No.: 14/919,234

(22) Filed: Oct. 21, 2015

(65) Prior Publication Data

US 2016/0116057 A1    Apr. 28, 2016

(30) Foreign Application Priority Data

Oct. 27, 2014  (JP) ................................. 2014-218241

(51) Int. Cl.
*F16H 59/02* (2006.01)
*F16H 59/10* (2006.01)

(52) U.S. Cl.
CPC ......... *F16H 59/0208* (2013.01); *F16H 59/02* (2013.01); *F16H 59/105* (2013.01); *F16H 2059/026* (2013.01)

(58) Field of Classification Search
CPC .................................................. F16H 59/0208
See application file for complete search history.

(56) References Cited

U.S. PATENT DOCUMENTS

| 1,881,843 A | * | 10/1932 | Morley ............... F16H 59/0208 74/473.29 |
| 6,109,130 A | | 8/2000 | Will |
| 9,423,020 B2 | * | 8/2016 | Nakanishi ........... B60R 21/0286 |
| 2002/0124675 A1 | * | 9/2002 | Hashimoto ......... F16H 59/0208 74/473.29 |

FOREIGN PATENT DOCUMENTS

| DE | 2460769 A1 | 7/1976 |
| EP | 2112408 A1 | 10/2009 |
| EP | 2578430 A1 | 4/2013 |
| EP | 3012490 A1 | 4/2016 |

(Continued)

OTHER PUBLICATIONS

Office Action issued in the corresponding Chinese Patent Application No. 201510599685.0 dated Mar. 28, 2017.

(Continued)

*Primary Examiner* — Terence Boes
(74) *Attorney, Agent, or Firm* — Robert Mlotkowski Safran Cole & Calderon, P.C.

(57) ABSTRACT

In a shift lever device, when a lever is rotate-operated to an "R" position or a "D" position, a cushion of the lever abuts a stopper inside the housing, and the rotating operation of the lever is stopped. Note that when the lever is rotate-operated to the "R" position or the "D" position under a heavy load, a low rigidity plate and a low rigidity tube of the cushion undergo elastic deformation, and the high rigidity column of the cushion is sandwiched between the lever and the stopper. The rotating operation of the lever is thereby restricted. The high rigidity column is thereby able to effectively restrict the rotating operation of the lever.

10 Claims, 6 Drawing Sheets

(56) References Cited

FOREIGN PATENT DOCUMENTS

| JP | S61107024 U | 7/1986 |
| JP | 06063953 U | 9/1994 |
| JP | 2002029277 | 1/2002 |
| JP | 2006182112 A | 7/2006 |

OTHER PUBLICATIONS

Japanese Office Action issued for corresponding Japanese Patent Application No. 2014-218241 dated Aug. 23, 2016 and English translation thereof.
Extended European Search Report for Application No. 15191204.5-1752 dated Mar. 7, 2016.
Office Action issued in the corresponding European Patent Application No. 15191204.5 dated Dec. 20, 2017.
Office Action issued in the corresponding Chinese Patent Application No. 201510599685.0 dated Oct. 25, 2017.

* cited by examiner

SHIFT DEVICE

CROSS-REFERENCE TO RELATED APPLICATION

This application claims priority under 35 USC 119 from Japanese Patent Application No. 2014-218241 filed Oct. 27, 2014, the disclosure of which is incorporated by reference herein.

BACKGROUND

Field of the Invention

The present invention relates to a shift device in which shift positions are changed by moving a shift body.

Related Art

In a shift lever device described in Japanese Patent Application Laid-Open (JP-A) No. 2002-29277, when movement of a shift lever is stopped by a base plate, a formation portion of a cushion deformation absorbing section of a cushion is deformed, and the impact from the shift lever to the base plate is absorbed.

In the above-described shift lever device, the formation portion of the cushion deformation absorbing section of the cushion is configured with a low rigidity.

SUMMARY

In consideration of the above circumstances, a shift device in which an absorbing section is capable of effectively restricting movement of a shift body is obtained.

A shift device of a first aspect includes: a shift body that changes shift positions by moving; a stop body that stops movement of the shift body; and an absorbing section that is provided at least one of the shift body or the stop body, that is provided with a low rigidity portion having low rigidity and a high rigidity portion having high rigidity, and that absorbs impact from the shift body to the stop body (that absorbs impact from the shift body to the stop body and restricts movement of the shift body) by the low rigidity portion deforming and the high rigidity portion being sandwiched between the shift body and the stop body when movement of the shift body is stopped by the stop body.

A shift device of a second aspect is the shift device of the first aspect, wherein a plurality of the high rigidity portions are provided at the absorbing section.

A shift device of a third aspect is the shift device of the first aspect or the second aspect, wherein at least one of an inner peripheral face or an outer peripheral face of the low rigidity portion is not provided with a bent portion.

In the third aspect, it is possible that the at least one of the inner peripheral face or the outer peripheral face of the low rigidity portion is configured by only a curved face.

In the first aspect, it is possible that, in a moving direction of the shift body, an end portion, which is at a side of the stop body, of the high rigidity portion is positioned further toward a side of the stop body than an end portion, which is at a side of the stop body, of the low rigidity portion, further it is possible that, in the moving direction of the shift body, a dimension of the high rigidity portion is the same as a dimension of the low rigidity portion.

In the first aspect, it is possible that the high rigidity portion and the low rigidity portion are connected, and the low rigidity portion is elastically deformed by the high rigidity portion being moved.

In the shift device of the first aspect, the shift position is changed by moving the shift body. The movement of the shift body is stopped by the stop body. At least one of the shift body or the stop body is provided with the absorbing section, and the absorbing section absorbs the impact from the shift body to the stop body when the movement of the shift body is stopped by the stop body.

Note that the absorbing section is provided with the low rigidity portion having the low rigidity and the high rigidity portion having the high rigidity, and that the low rigidity portion deforms, and the high rigidity portion is sandwiched between the shift body and the stop body when the movement of the shift body is stopped by the stop body. This enables the movement of the shift body to be effectively restricted by the absorbing section.

In the shift device of the second aspect, the absorbing section is provided with plural of the high rigidity portions. The plural high rigidity portions are thereby sandwiched between the shift body and the stop body when the movement of the shift body is stopped by the stop body. This enables the movement of the shift body to be even more effectively restricted by the absorbing section.

In the shift device of the third aspect, at least one of the inner peripheral face or the outer peripheral face of the low rigidity portion is not provided with a bent portion. This enables the rigidity of the low rigidity portion to be effectively reduced.

BRIEF DESCRIPTION OF THE DRAWINGS

Embodiments of the invention will be described in detail with reference to the following figures, wherein:

FIGS. 5A to 5C are drawings illustrating a cushion of a shift lever device according to an exemplary embodiment, wherein FIG. 5A is a face-on (front) view, FIG. 5B is a cross-section taken along the width direction (a cross-section along line B-B in FIG. 5A), and FIG. 5C is a back view; and FIGS. 6A and 6B are drawings illustrating a cushion of a shift lever device according to an exemplary embodiment, wherein FIG. 6A is a cross-section viewed along the length direction, (a cross-section along line A-A in FIG. 5A), and FIG. 6B is a cross-section viewed along the length direction during deformation (a cross-section positioned at line A-A in FIG. 5A).

DETAILED DESCRIPTION

Figure 1:
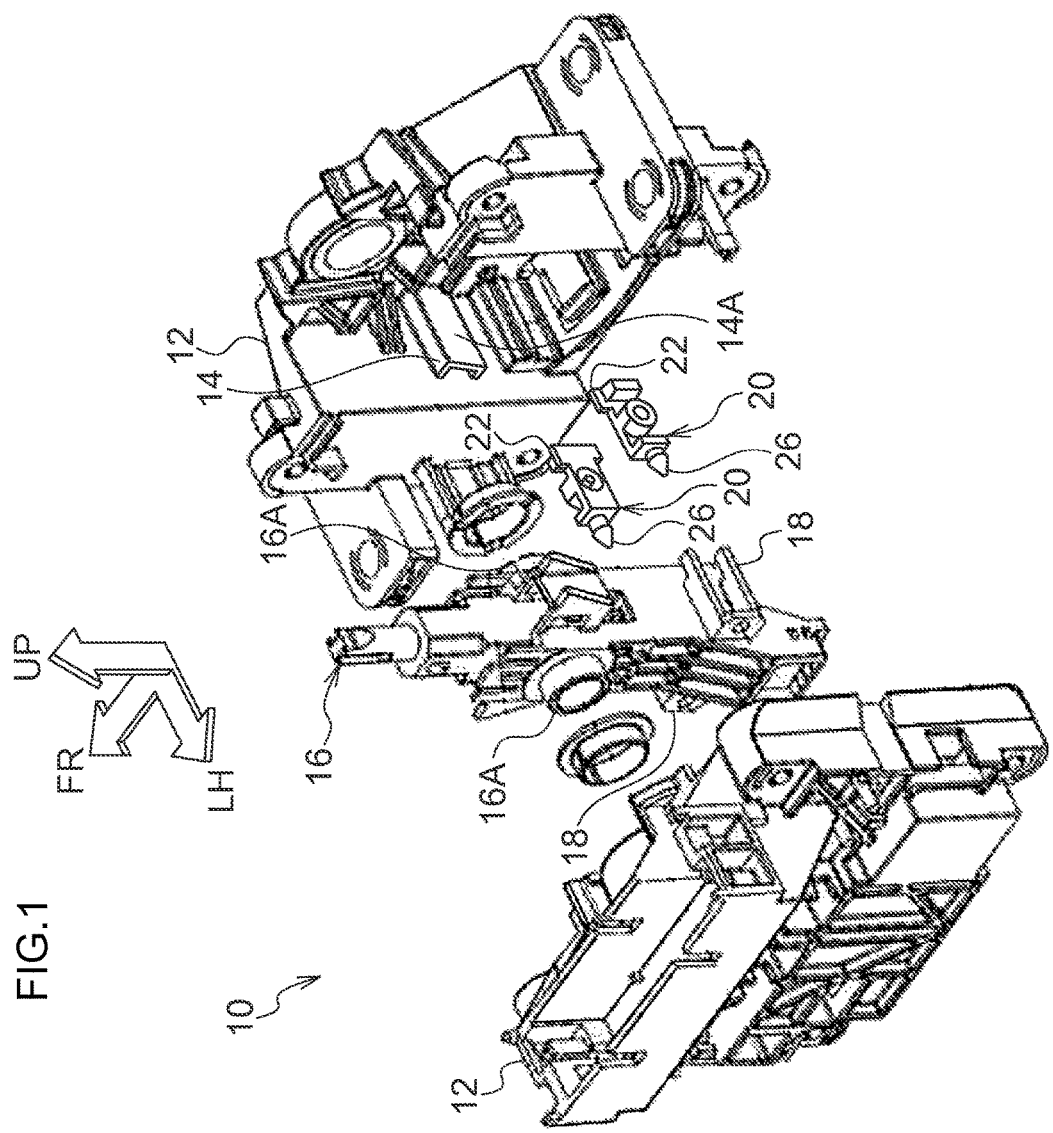
FIG. 1 is an exploded perspective view illustrating a shift lever device according to an exemplary embodiment, as viewed diagonally from the rear left.
Figure 2:
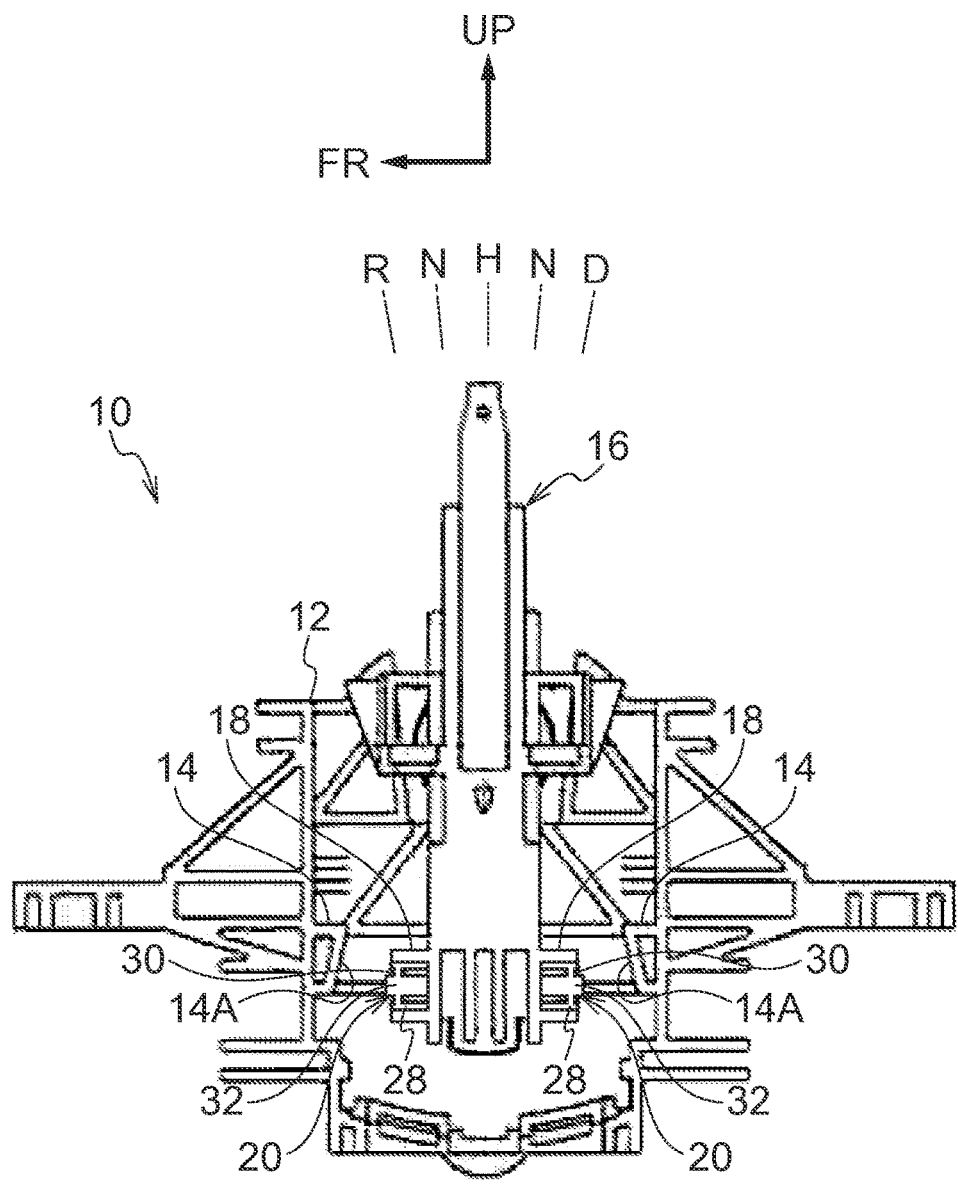
FIG. 2 is a cross-section illustrating a shift lever device according to an exemplary embodiment, as viewed from the left.

FIG. 1 is an exploded perspective view of a shift lever device 10 serving as a shift device according to an exemplary embodiment, viewed diagonally from the rear and the left, and FIG. 2 is a cross-section of the shift lever device 10 viewed from the left. Note that in the drawings, the arrow FR indicates the front of the shift lever device 10, the arrow LH indicates the left of the shift lever device 10, and the arrow UP indicates the upper side of the shift lever device 10.

The shift lever device 10 according to the present exemplary embodiment is what is referred to as a straight type and is a shift-by-wire type. The shift lever device 10 is a floor-mounted type, and is installed to a floor section of a vehicle cabin, at the vehicle width direction inside of a driving seat of a vehicle (automobile) (not shown in the drawings). The front side, the left side, and the upper side of the shift lever device 10 are oriented toward the front side, the left side, and the upper side of the vehicle.

As illustrated in FIG. 1 and FIG. 2, the shift lever device 10 is provided with resin rectangular parallelopiped box shaped housing 12 (plate), serving as an stop body which is as a vehicle body side, and the housing 12 is fixed to the floor section of the vehicle cabin.

Stoppers 14, each with a U-shaped plate shaped cross-section and serving as a stop section, are integrally formed at up-down direction intermediate portions of inner faces of a front wall and a rear wall of the housing 12, and each stopper 14 extends along the left-right direction. An upper wall and a lower wall of each stopper 14 are formed in flat plate shapes and disposed perpendicular to the up-down direction. A flat plate shaped stop wall 14A is formed, sloping in a direction toward the outside (the inner face side of the front wall (the rear wall)) of the housing 12 on progression toward the lower side, between the upper wall and the lower wall of each stopper 14.

The shift lever device 10 is provided with a resin, elongated rod shaped lever 16, serving as a shift body. A pair of circular tube shaped support shafts 16A are integrally formed at an up-down direction intermediate portion of the lever 16, and the support shafts 16A project out toward the left side and right side of the lever 16. The lever 16 is supported, with the pair of support shafts 16A, at an upper portion inside the housing 12, and the lever 16 is capable of rotating (moving) in the front-rear direction with the pair of support shafts 16A as the center axis.

The lever 16 extends out toward the upper side of the housing 12 so as to be capable of rotating, and an upper end portion of the lever 16 is capable of being rotating-operated by an occupant of the vehicle (the driver in particular). The lever 16 is thereby capable of being rotating-operated to an "R" position (reverse position), an "N" position (neutral position), an "H" position (home position), an "N" position (neutral position), or a "D" position (drive position), each serving as a shift position, on progression from the front side to the rear side. The lever 16 is urged in direction, from the "R" position and the "D" position, toward the "H" position, and the lever 16 is rotated toward the "H" position by an urging force when there is no rotating operation force acting on the lever 16.

A lower portion of the lever 16 is integrally formed with a pair of assembly frames 18, each formed with a substantially U-shaped frame shaped cross-section and serving as an assembly portion. The assembly frames 18 project out toward the front side and rear side of the lever 16, and a face at the opposite side to the lever 16 and a right face of each assembly frame 18 are open.

A cushion 20 (see FIGS. 5A to 5C and FIG. 6A), made of soft resin and serving as an absorbing section, is assembled to each assembly frame 18. The cushions 20 have a lower rigidity (higher elasticity) than the lever 16 (including the assembly frames 18).

At a back side end portion of each of the cushions 20, a substantially rectangular plate shaped back wall 22, serving as a base portion, is provided. The back wall 22 is in face-to-face contact with the lever 16, and is fitted inside the assembly frame 18 in the up-down direction. A rectangular column shaped assembly wall 24 is integrally formed at a left end of the back wall 22. The assembly wall 24 projects out from the back wall 22 toward the opposite side to the lever 16 (toward the front side of the cushion 20), and is fitted inside the assembly frame 18 in the up-down direction.

An assembly protrusion 26 is integrally formed at the left side of each of the assembly walls 24. A leading end side portion of the assembly protrusion 26 is formed in a substantially circular conical shape, and a base end side portion of the assembly protrusion 26 is formed in a substantially circular column shape. In the assembly protrusion 26, the leading end side portion is pierced through a left wall of the assembly frame 18 while the leading end side portion temporarily undergoing elastic deformation, the base end side portion is pierced through and fitted with the left wall of the assembly frame 18, and movement of a left end portion of the cushion 20 is stopped in the front-rear direction, in the left-right direction, and in the up-down direction by the left wall of the assembly frame 18. A right end portion of the back wall 22 projects out in the up-down direction, an upper end and a lower end of the right end portion of the back wall 22 are respectively anchored (stopped) to the upper wall and the lower wall of the assembly frame 18, and movement toward the opposite side to the lever 16 is stopped.

At a left-right direction intermediate portion of the back wall 22, a substantially circular tube shaped low rigidity tube 28, serving as a low rigidity portion, is integrally formed. The low rigidity tube 28 projects out from the back wall 22 toward the opposite side to the lever 16. An upper end portion and a lower end portion of an outer peripheral face of the low rigidity tube 28 are formed with planar face shapes, and a portion other than the upper end portion and the lower end portion of the outer peripheral face are formed in a circular circumferential face shape. The upper end portion and the lower end portion of the outer peripheral face of the low rigidity tube 28 are in the same plane as an upper face and a lower face of the back wall 22, respectively. The low rigidity tube 28 is fitted inside the assembly frame 18 in the up-down direction. The low rigidity tube 28 projects out slightly with respect to the upper wall and the lower wall of the assembly frame 18 toward the opposite side to the lever 16. An inner peripheral face of the low rigidity tube 28 is formed with a circular circumferential face shape, and at the inside of the low rigidity tube 28, the back wall 22 is penetrated such so as to open at the lever 16 side (the back side of the cushion 20). The low rigidity tube 28 has a lower wall thickness than the back wall 22 and the assembly wall 24, and the low rigidity tube 28 has a lower rigidity than the back wall 22 and the assembly wall 24. Note that the wall thicknesses of the low rigidity tube 28, the back wall 22 and the assembly wall 24 are thicknesses of a tube portion configuring the low rigidity tube 28, a rectangular plate portion configuring the back wall 22 and a rectangular column (plate) portion configuring the assembly wall 24, respectively.

A circular ring plate shaped low rigidity plate 30, serving as a low rigidity portion, is integrally and coaxially formed to the inner peripheral side of the low rigidity tube 28, and the low rigidity plate 30 is coupled to a portion of the low rigidity tube 28 at the opposite side to the lever 16 (for example, a portion in the vicinity of a projecting leading end of the low rigidity tube 28). The low rigidity plate 30 has a lower wall thickness similarly to the low rigidity tube 28 (for example, the low rigidity plate 30 has a lower wall thickness than the back wall 22 and the assembly wall 24), and the low rigidity plate 30 also has a lower rigidity similarly to the low rigidity tube 28 (for example, the low rigidity plate 30 has a lower rigidity than the back wall 22 and the assembly wall 24). Note that the wall thickness of the low rigidity plate 30 is a thickness of a circular ring plate portion configuring the low rigidity plate 30.

A circular column shaped high rigidity column 32, serving as a high rigidity portion, is integrally and coaxially formed to the inner peripheral side of the low rigidity plate 30, and the high rigidity column 32 is coupled to the low rigidity plate 30 at a portion at the opposite side to the lever 16 (for example, in a vicinity of an end portion of the high rigidity column 32 at the opposite side to the lever 16). An axial direction dimension of the high rigidity column 32 is set the same as a dimension of the base wall 22 and the low rigidity tube 28 in an axial direction of the low rigidity tube 28, the high rigidity column 32 projects out with respect to the low rigidity tube 28 toward the opposite side to the lever 16, and is separated from the lever 16. Namely, the end of the high rigidity column 32 at the opposite side to the lever 16 projects out with respect to the projecting leading end of the low rigidity tube 28 toward the opposite side to the lever 16, and an end of the high rigidity column 32 at the lever 16 side is separated from the lever 16. The diameter of the high rigidity column 32 is larger than the wall thickness of the low rigidity tube 28 and the wall thickness of the low rigidity plate 30, and the high rigidity column 32 has a higher rigidity (lower elasticity) than the low rigidity tube 28 and the low rigidity plate 30.

At a right end portion of the cushion 20, a rectangular column shaped high rigidity wall 34, serving as a high rigidity portion, is formed, and the high rigidity wall 34 is configured including a portion of the back wall 22. The high rigidity wall 34 projects out from the back wall 22 toward the opposite side to the lever 16, and the high rigidity wall 34 is fitted inside the assembly frame 18 in the up-down direction. The high rigidity wall 34 projects out slightly with respect to the upper wall and the lower wall of the assembly frame 18 toward the opposite side to the lever 16. A face of the high rigidity wall 34 at the opposite side to the lever 16 is disposed in a position in the same plane as a face of the low rigidity tube 28 at the opposite side to the lever 16. A wall thickness (thickness in the vehicle right-left direction (LH direction) in FIGS. 6A and 6B) of the high rigidity wall 34 is thicker than the diameter of the high rigidity column 32, and the high rigidity wall 34 has a higher rigidity than the high rigidity column 32.

Figure 3:
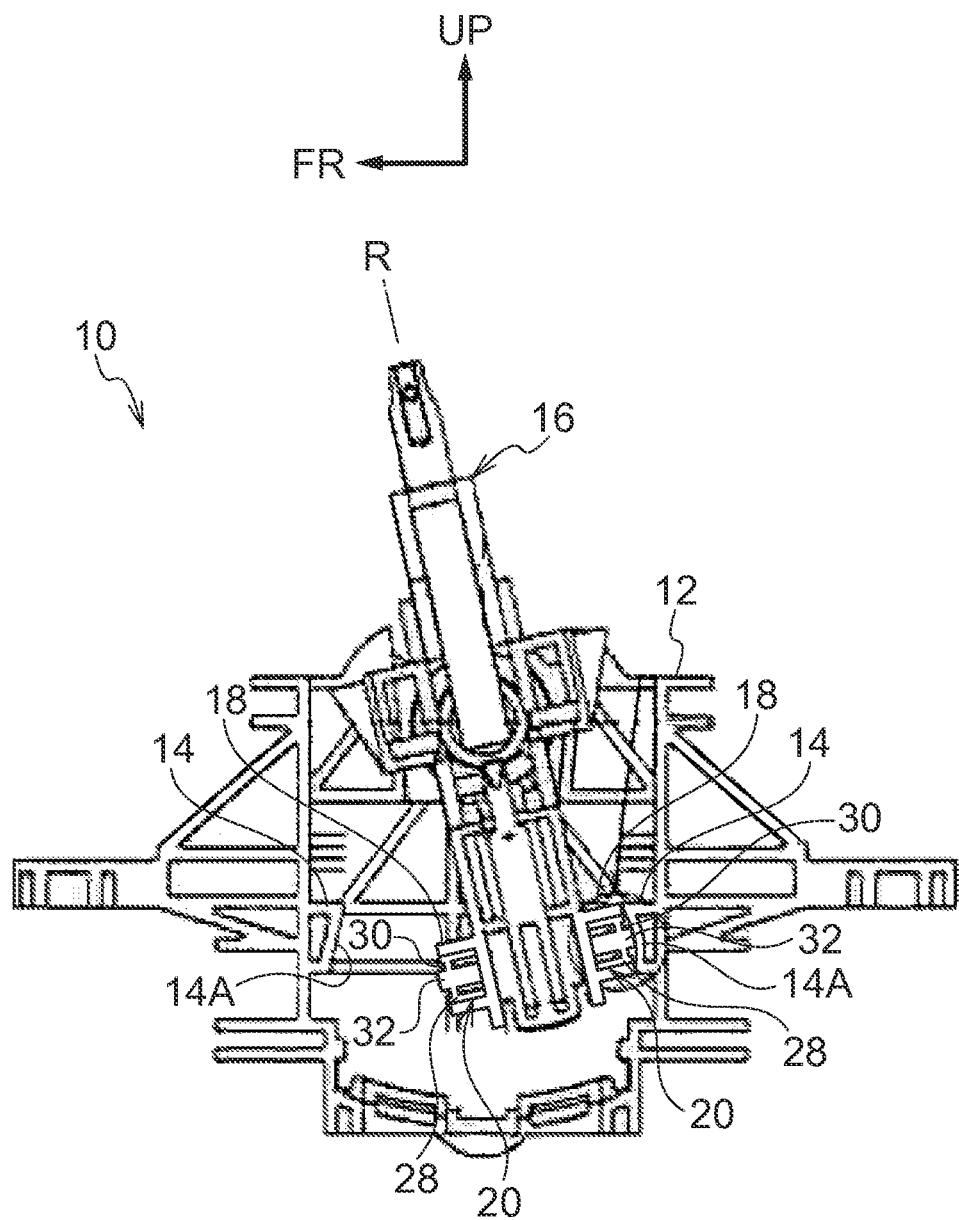
FIG. 3 is a cross-section illustrating a rotating operation of a lever to an "R" position in a shift lever device according to an exemplary embodiment, as viewed from the left.
Figure 4:
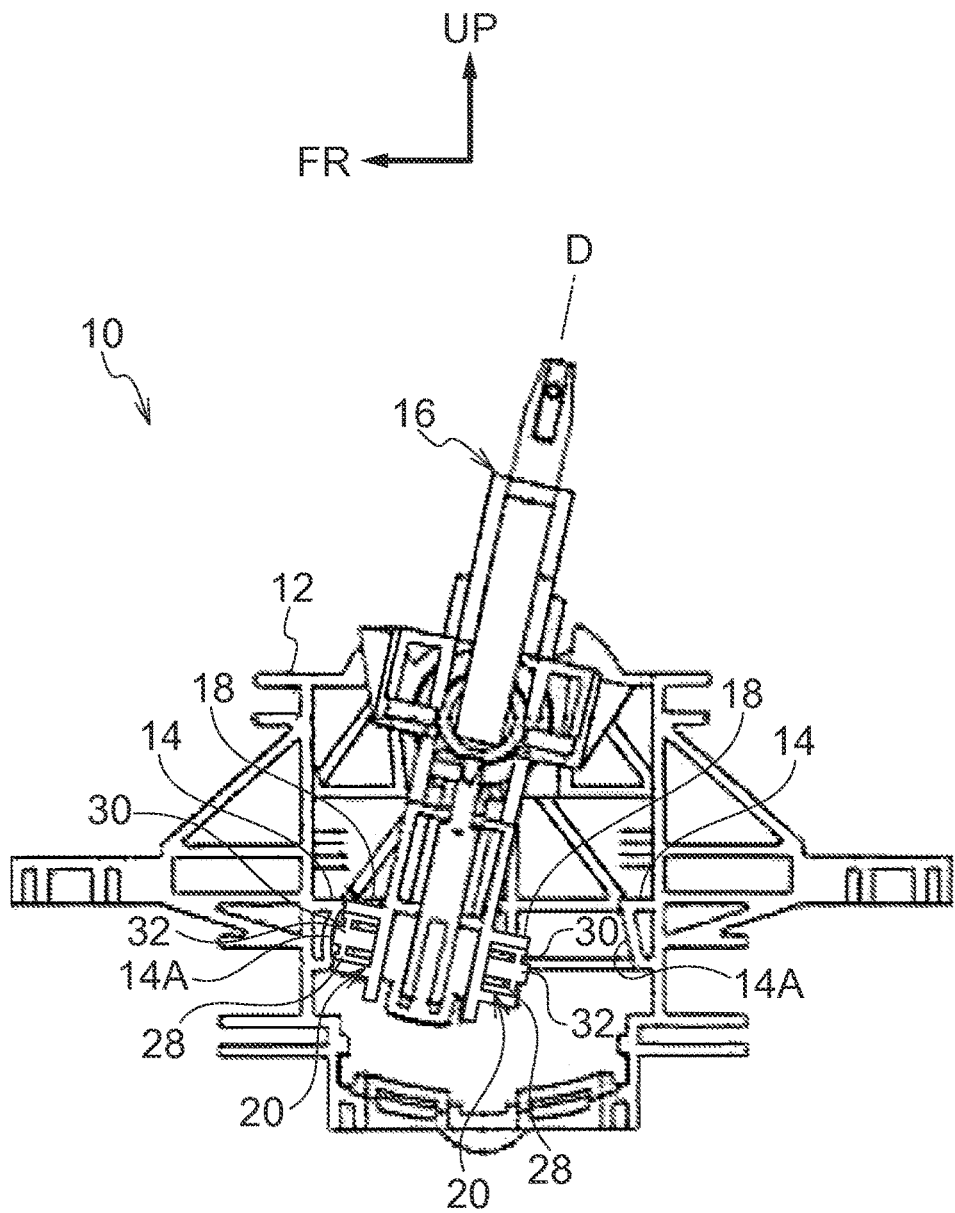
FIG. 4 is a cross-section illustrating a rotating operation of a lever to a "D" position in a shift lever device according to an exemplary embodiment, as viewed from the left.
Figure 5:
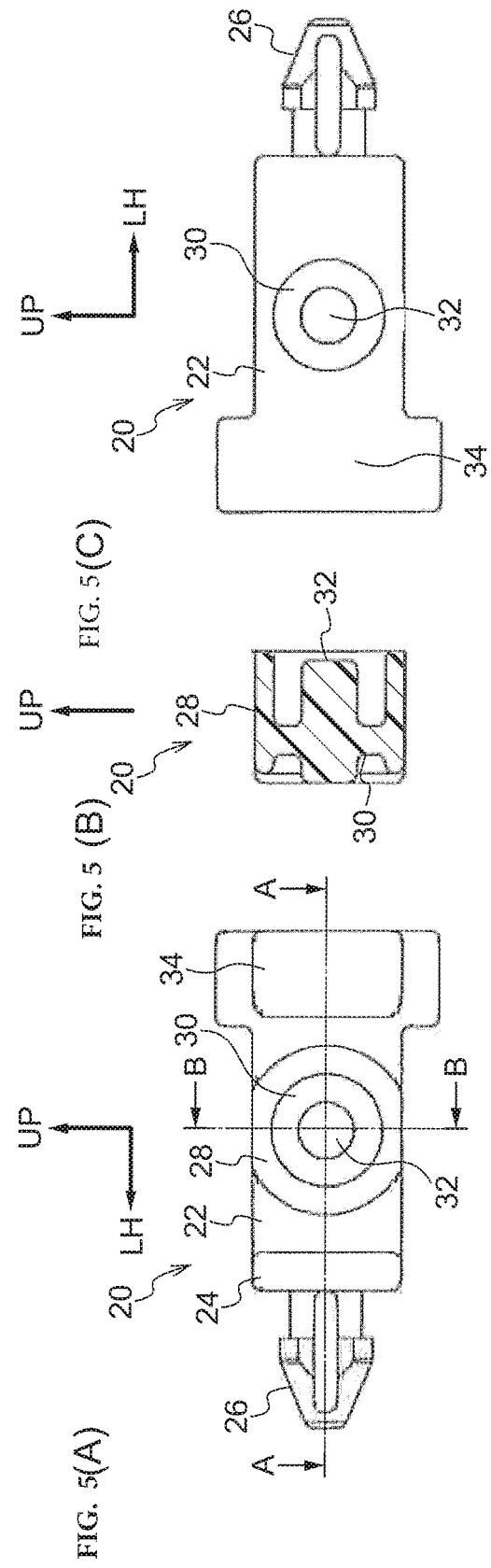
Figure 6:
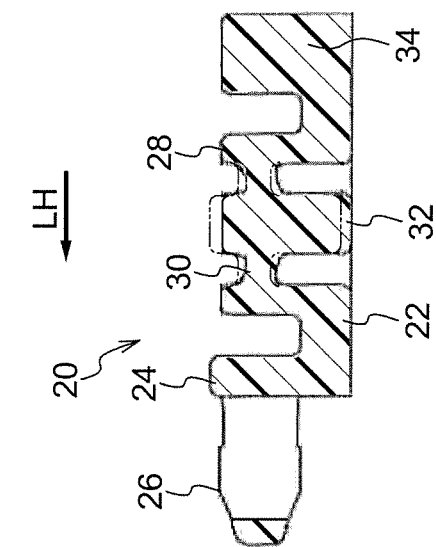
Figure 6:
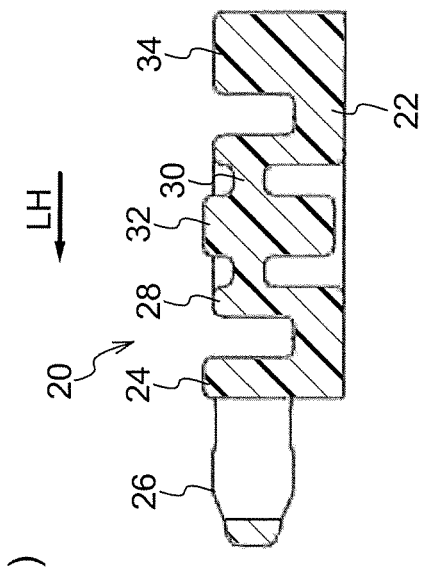

When the lever 16 is rotate-operated to the "R" position, the low rigidity tube 28, the high rigidity column 32, and the high rigidity wall 34 of the rear side cushion 20 are able to abut the stop wall 14A of the rear side stopper 14 inside the housing 12 (see FIG. 3). When the lever 16 is rotate-operated to the "D" position, the low rigidity tube 28, the high rigidity column 32, and the high rigidity wall 34 of the front side cushion 20 are able to abut the stop wall 14A of the front side stopper 14 inside the housing 12 (see FIG. 4). Note that the assembly walls 24 of the cushions 20 are unable to abut the respective stoppers 14.

Explanation follows regarding operation of the present exemplary embodiment.

In the shift lever device 10 with the above configuration, when the lever 16 is rotate-operated to the "R" position or the "D" position, the cushion 20 of the lever 16 contacts the stop wall 14A of the stopper 14 inside the housing 12, and the rotating operation of the lever 16 is stopped by the housing 12.

When the lever 16 is rotate-operated to the "R" position or the "D" position under a normal load (a load smaller than a predetermined load), the high rigidity column 32 of the cushion 20 abuts the stop wall 14A of the stopper 14 and moves toward the lever 16 side. At this time, the low rigidity plate 30 and the low rigidity tube 28 (the low rigidity plate 30 in particular) of the cushion 20 thereby undergo elastic deformation in a state in which the high rigidity column 32 does not abut the lever 16. Namely, at this time, only the high rigidity column 32 of the cushion 20 abuts the stop wall 14A of the stopper 14, but the low rigidity tube 28 and the high rigidity wall 34 of the cushion 20 do not abut the stop wall 14A of the stopper 14. At this time, the low rigidity plate 30 elastically deforms due to this movement of the high rigidity column 32 which is connected to the low rigidity plate 30, and the low rigidity tube 28 elastically deforms due to this elastic deform of the low rigidity plate 30 which is connected to the low rigidity tube 28. This enables the impact from the lever 16 to the housing 12 to be absorbed by elastic deformation of the low rigidity plate 30 and the low rigidity tube 28, and enables noise caused by the lever 16 striking the housing 12 to be reduced.

Note that when the lever 16 is rotate-operated to the "R" position or the "D" position under a higher load than normal (a load equal to or more than the predetermined load), the high rigidity column 32 of the cushion 20 abuts the stop wall 14A of the stopper 14 and moves toward the lever 16 side. At this time, the low rigidity plate 30 and the low rigidity tube 28 (the low rigidity plate 30 in particular) of the cushion 20 thereby undergo elastic deformation, and the high rigidity column 32 abuts the lever 16, further, the high rigidity wall 34 of the cushion 20 abuts the stop wall 14A of the stopper 14 (see FIG. 6B).

This enables the impact from the lever 16 to the housing 12 to be absorbed by elastic deformation of the low rigidity plate 30, the low rigidity tube 28, the high rigidity column 32, and the high rigidity wall 34, and enables noise caused by the lever 16 striking the housing 12 to be reduced.

Furthermore, the high rigidity column 32 and the high rigidity wall 34 are sandwiched and held between the lever 16 and the stop wall 14A of the stopper 14 (by the lever 16 and the stop wall 14A of the stopper 14), thereby restricting the rotating operation of the lever 16. The high rigidity column 32 and the high rigidity wall 34 are thereby able to effectively restrict the rotating operation of the lever 16, and are able to effectively restrict the rotate stroke of the lever 16.

Supposing that the low rigidity plate 30 and the low rigidity tube 28 of the cushion 20 (the low rigidity plate 30 in particular) undergo permanent deformation, and the lever 16 is rotate-operated to the "R" position or the "D" position in a state in which the high rigidity column 32 of the cushion 20 abuts the lever 16 (see FIG. 6B), the high rigidity column 32 and the high rigidity wall 34 of the cushion 20 abut the stop wall 14A of the stopper 14 and undergo elastic deformation.

This enables the impact from the lever 16 to the housing 12 to be absorbed by elastic deformation of the high rigidity column 32 and the high rigidity wall 34, and enables noise caused by the lever 16 striking the housing 12 to be reduced.

Furthermore, by sandwiching and holding the high rigidity column 32 and the high rigidity wall 34 between the lever 16 and the stop wall 14A of the stopper 14, the rotating operation of the lever 16 is restricted. The high rigidity column 32 and the high rigidity wall 34 are thereby able to effectively restrict the rotating operation of the lever 16, and are able to effectively restrict the rotate stroke of the lever 16.

As described above, the rotating operation of the lever 16 is restricted by two high rigidity portions (the high rigidity column 32 and the high rigidity wall 34). This enables the rotating operation of the lever 16 to be more effectively restricted, and the rotate stroke of the lever 16 to be more effectively restricted, than in a case in which the rotating operation of the lever 16 is restricted by a single high rigidity portion.

Moreover, since a bent portion (a joint portion between a planar face and a planar face) is not provided to the inner peripheral face and the outer peripheral face of the low rigidity tube 28, namely, the cross section of the low rigidity tube 28, seen from the rotating direction of the lever 16, is configured by substantially curved faces only, in particular, the inner peripheral face of the low rigidity tube 28 is configured by curved face only, the rigidity of the low rigidity tube 28 can be effectively reduced. Thus, when the lever 16 is rotate-operated to the "R" position or the "D" position, the low rigidity tube 28 can favorably undergo elastic deformation, and the high rigidity column 32 can favorably move toward the lever 16 side.

Note that in the present exemplary embodiment, the cushions 20 are provided to the lever 16. However, cushions 20 may be provided to the housing 12, in addition to, or instead of, these cushions 20. In such cases, stoppers 14 (the stop walls 14A) may be provided to the lever 16.

In the present exemplary embodiment, each cushion 20 is provided with two high rigidity portions (the high rigidity column 32 and the high rigidity wall 34). However, the cushion 20 may be provided with one, or three or more, high rigidity portions.

In the present exemplary embodiment, a bent portion is not provided to the inner peripheral face and the outer peripheral face of the low rigidity tube 28. However, a bent portion may be provided to at least one of the inner peripheral face or the outer peripheral face of the low rigidity tube 28.

In the present exemplary embodiment, the shift lever device 10 is a shift-by-wire type shift device. However, the shift lever device 10 may be a shift device other than a shift-by-wire type (such as a mechanical cable type).

In the present exemplary embodiment, the shift lever device 10 is a floor-mounted type installed at the floor section of the vehicle cabin. However, the shift lever device 10 may be installed to a steering wheel column cover or an instrument panel in the vehicle cabin.

What is claimed is:

1. A shift device comprising:
a shift body that changes shift positions by moving;
a stop body that movably supports the shift body, and that stops movement of the shift body; and
an absorbing section that is provided on at least one of the shift body or the stop body, that is provided with a low rigidity portion having low rigidity and a high rigidity portion having high rigidity, and that absorbs impact from the shift body to the stop body and restricts movement of the shift body by the low rigidity portion deforming and the high rigidity portion being sandwiched between the shift body and the stop body when movement of the shift body is stopped by the stop body, wherein, in a moving direction of the shift body, an end portion, which is at a side of the stop body, of the high rigidity portion is positioned further toward a side of the stop body than an end portion, which is at a side of the stop body, of the low rigidity portion, wherein, in the moving direction of the shift body, a dimension of the high rigidity portion is the same as a dimension of the low rigidity portion.

2. The shift device of claim 1, wherein a plurality of the high rigidity portions are provided at the absorbing section.

3. The shift device of claim 1, wherein at least one of an inner peripheral face or an outer peripheral face of the low rigidity portion is not provided with a bent portion.

4. The shift device of claim 3, wherein the at least one of the inner peripheral face or the outer peripheral face of the low rigidity portion is configured by only a curved face.

5. The shift device of claim 1, wherein the high rigidity portion and the low rigidity portion are connected, and the low rigidity portion is elastically deformed by the high rigidity portion being moved.

6. The shift device of claim 1, wherein the high rigidity portion and the low rigidity portion are connected, and the low rigidity portion is elastically deformed by the high rigidity portion being moved.

7. The shift device of claim 1, wherein the stop body is a housing of the shift device, the housing being fixed to a vehicle body side.

8. The shift device of claim 7, wherein the shift body includes a support shaft that is supported at the housing.

9. The shift device of claim 1, wherein a dimension of the high rigidity portion and a dimension of the low rigidity portion are the same in a stop direction in which the movement of the shift body is stopped by the stop body.

10. The shift device of claim 1, wherein the absorbing section is provided at the shift body.

* * * * *